United States Patent
Callon

(10) Patent No.: US 8,351,341 B1
(45) Date of Patent: Jan. 8, 2013

(54) FILTERING TO PROTECT CLASS OF SERVICE

(75) Inventor: Ross W. Callon, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 3905 days.

(21) Appl. No.: 10/211,635

(22) Filed: Aug. 2, 2002

(51) Int. Cl.
*H04L 12/28* (2006.01)
(52) U.S. Cl. .................................. 370/252; 370/395.43
(58) Field of Classification Search .......... 370/229–235, 370/252, 352, 395.43
See application file for complete search history.

(56) References Cited

U.S. PATENT DOCUMENTS

| | | | |
|---|---|---|---|
| 6,654,373 B1 * | 11/2003 | Maher et al. | 370/392 |
| 6,728,213 B1 * | 4/2004 | Tzeng et al. | 370/235 |
| 7,058,974 B1 * | 6/2006 | Maher et al. | 726/13 |
| 2003/0118029 A1 * | 6/2003 | Maher et al. | 370/395.21 |

* cited by examiner

*Primary Examiner* — Steven H Nguyen
(74) *Attorney, Agent, or Firm* — Harrity & Harrity, LLP

(57) ABSTRACT

A first field of a data unit is analyzed to determine whether the data unit is marked as a particular type of data unit. If the data unit is marked as a particular type of data unit, a second field of the data unit is analyzed to determine whether characteristics of the second data field correspond to the particular type of the data unit. Determining whether the characteristics of the second field correspond to the type of data unit ensures that the data unit is properly marked with respect to type. The first field may indicate a particular priority or that the data unit is carrying voice data. The second field may carry voice data. The analysis of the fields may be done on a data unit by data unit basis, or on a stream basis.

52 Claims, 4 Drawing Sheets

FILTERING TO PROTECT CLASS OF SERVICE

BACKGROUND OF THE INVENTION

The present invention related generally to networks and, more particularly, to systems and methods for protecting class of service.

Data transported through a network is often transferred in data units. To distinguish one type of data unit from another, data units may be marked with priority information. The class of service (CoS) field is an example of such priority marking. Priority fields may affect the way data is handled in the network. For example, data may be queued, dequeued, forwarded, and discarded in a certain manner based on priority.

Voice data is often marked as high priority because voice data is real-time data and therefore needs to be transported with a higher priority relative to other data. It has been proposed to assign a particular priority value to voice data in networks. This allows voice data to be identified and treated uniquely relative to other data. Problems may arise however, if a sender attempts to transmit non-voice data marked with a priority indicating it is voice data. The sender is attempting to give its non-voice data priority over other non-voice data. A network element, other than the sender, may also be configured to mark the priority field to indicate voice data is being transported when in fact the data is not voice data.

Data units marked incorrectly as voice data may cause problems in the network. For example, congestion may occur in the voice traffic and valid voice data may be dropped.

Thus, there is a need for adequately addressing these types of problems in a network.

SUMMARY OF THE INVENTION

Systems and methods consistent with the principles of the invention protect CoS by ensuring that data units marked as voice data units are in fact voice data units. Data units marked as voice data units that are not voice data units are considered out of spec and may be discarded or modified. For example, an out of spec data unit may have a voice indicator field modified so that it no longer indicates that the data unit is carrying voice data. The data unit may also be marked to indicate that the data unit is out of spec so that downstream devices can treat the data unit accordingly as an out of spec data unit. An out of spec indication may be sent to other elements separate from the data unit. A data unit being found out of spec may also affect how other data units in the same stream are treated in the network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

DESCRIPTION OF THE PREFERRED EMBODIMENTS

Figure 1:
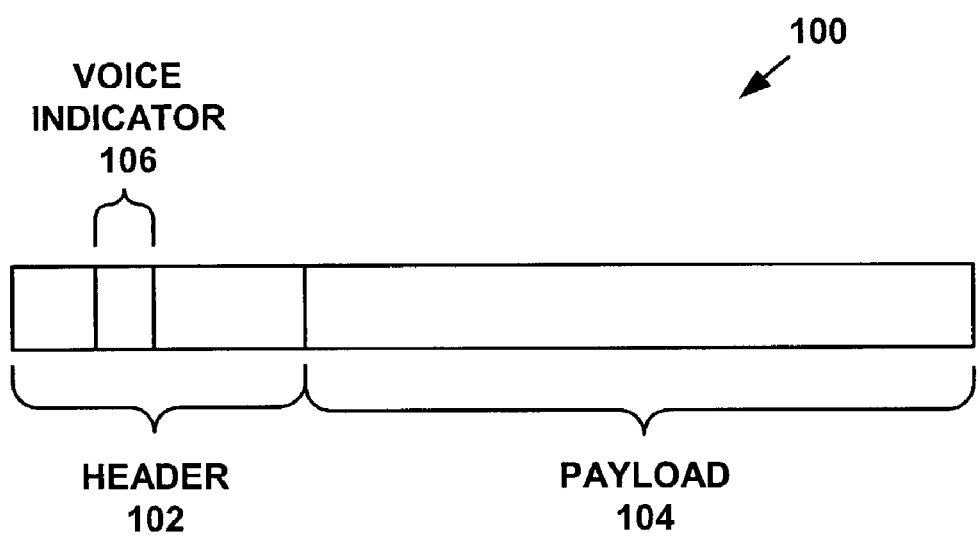
FIG. 1 illustrates a packet 100 for transporting information in a network.

Reference will now be made in detail to embodiments consistent with the principles of the invention, examples of which are illustrated in the accompanying drawings. The same reference numbers may be used in the drawings to refer to the same or like parts.

According to embodiments consistent with the principles of the invention, a network device may protect class of service (CoS) by determining whether a data unit marked as a voice data unit is in fact carrying voice data. To make the determination, a data unit marked as a voice data unit may be filtered. The filtering analyzes the characteristics of the payload to determine whether the data in the payload is voice data. One or more parts or the entire payload may be included in the analysis. If the data unit is marked as a voice data unit but the payload is not actually voice data, the data unit is considered out of spec.

Upon discovering an out of spec data unit, several measures may be taken to deal with the out of spec data unit. For example, the data unit may be discarded, marked as out of spec, a voice indicator field in the data unit could be modified, or a combination of these measures could be taken. The stream carrying the data unit may also be affected by the discovery of an out of spec data unit in the stream. For example, all data units in the stream could be discarded, marked as out of spec, or have their voice indicator fields altered. Out of spec data units may be treated differently in the network when they are queued, forwarded, processed, or when other operations on or with the data units are performed.

FIG. 1 illustrates a data unit 100 for transporting information in a network. Data unit 100 comprises a header 102 and a payload 104. In one embodiment, data unit 100 comprises a packet. Header 102 may include administrative information related to the packet. Payload 104 may carry data, control information, or a combination of data and control information.

Header 102 may include a voice indicator field 106 that indicates whether packet 100 is a voice packet, i.e., whether payload 104 is voice data. Voice indicator field 106 may be any field that could be interpreted by a network element to indicate that packet 100 is a voice packet. For example, in one embodiment voice indicator field 106 may comprise a priority field, such as a class-of-service (CoS) field. A particular CoS value or set of values may indicate that packet 100 is a voice packet. Other fields may also be used, including fields dedicated to indicating priority and fields used for other purposes. Voice indicator field 106 may be in any format, and may be a single bit or multiple bits.

In embodiments consistent with the present invention, when voice indicator field 106 indicates that payload 104 should be carrying voice data, payload 104 is filtered to determine if in fact packet 100 is carrying voice data. If the filtering indicates that payload 104 is not carrying voice data, meaning packet 100 is out of spec, measures may be taken to address the discrepancy between voice indicator field 106 and payload 104. For example, the packet may be dropped, flagged in some way, such as by modifying one or more bits or fields in packet 100, to indicate packet 100 is out of spec, voice indicator field 106 may be overwritten with another value indicating that payload 104 is carrying something other than voice data, or a combination of these measures may be taken. Additionally or alternatively, an out of spec indication may be provided to one or more elements involved in processing the packet.

Figure 2:
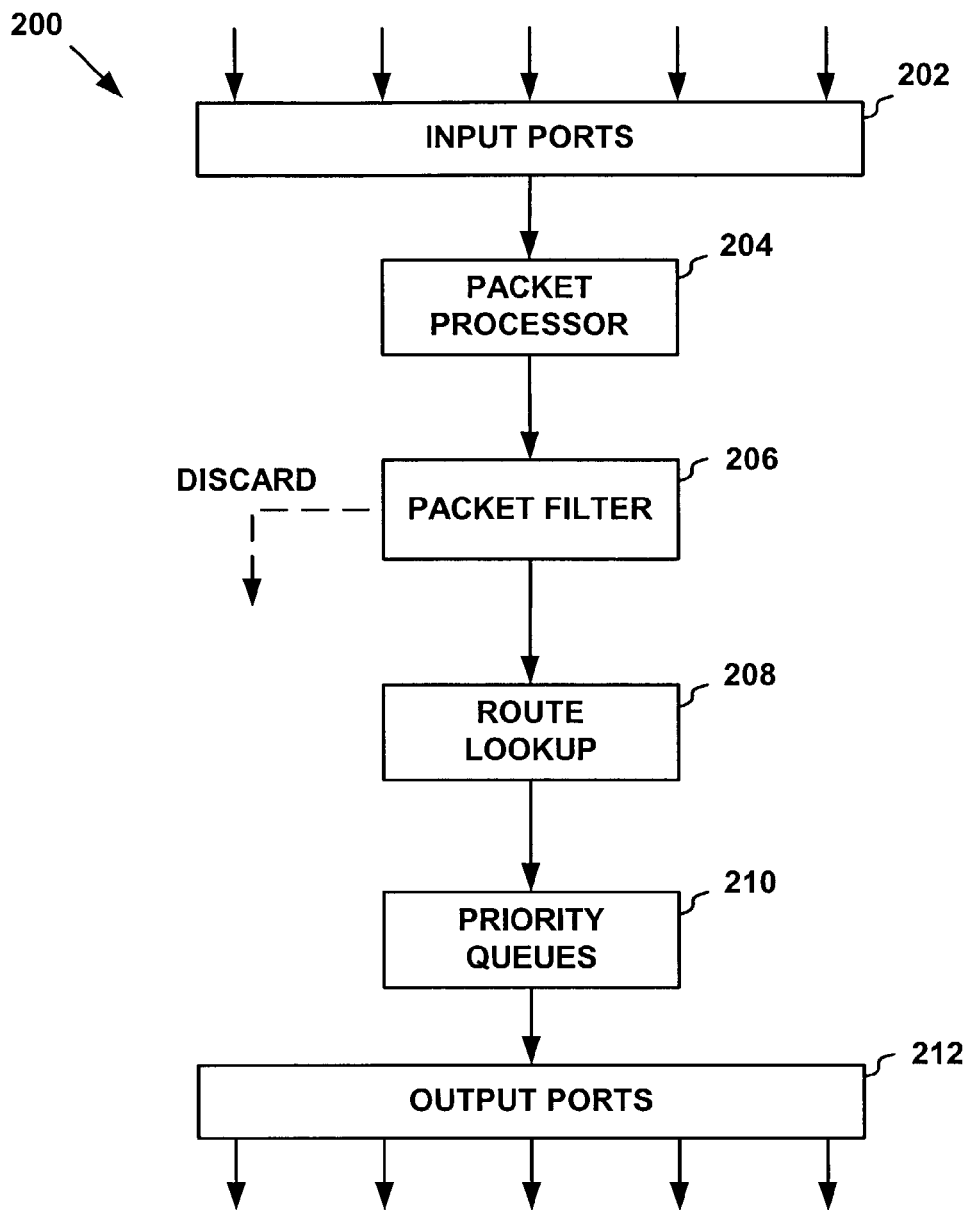
FIG. 2 is a block diagram illustrating a first embodiment of a device for protecting CoS consistent with the principles of the invention.

FIG. 2 is a block diagram illustrating a first embodiment of a device for protecting CoS consistent with the principles of the invention. Device 200 comprises input ports 202, a packet processor 204, a packet filter 206, a route lookup element 208, priority queues 210, and output ports 212. Input ports 202 receive data from a network on one or more inputs. Input ports 202 may process the data, such as by performing layer 1 (L1) processing on the incoming data. In this embodiment, input ports 202 forward layer 2 (L2) and layer 3 (L3) information to packet processor 204.

Packet processor 204 processes the L2/L3 information received from input ports 202. For example, packet processor 206 may analyze voice indicator field 106 of each packet to determine whether the packet is marked as a voice packet. In addition, packet processor 206 may perform other types of processing on the packet, such as processing the header of the packet, reformatting the packet into cells, performing policing, performing accounting, or a combination of these functions. After packet processor 204 processes the packet, the packet and results of the processing are forwarded to packet filter 206. The results may be transported with the packet, as sideband information, or as a combination of these.

Packet filter 206 may perform a variety of types of filtering for a variety of purposes. For example, packet filter 206 may filter the packets from packet processor 204 based on the results of the processing by packet processor 204. If no filtering is required, the packet may be sent directly to route lookup 208.

To protect CoS, packet processor 204 analyzes voice indicator field 106 to determine whether the packet is marked as a voice packet. If the packet is marked as a voice packet, packet filter 206 may filter payload 104 to determine whether payload 104 is actually carrying voice data. If packet filter 206 determines that the packet is marked as a voice packet, 206 may also filter multiple packets in a group of packets to determine whether the packets are marked as voice packets but are carrying non-voice data. For example, packet filter 206 may filter packets in each stream, and keep track of the filtering results for a stream of packets.

Determination of whether a packet marked as a voice packet actually contains data related to a voice call requires analyzing the packet for characteristics that are consistent with the operations of voice protocols over data networks. For example, voice may make use of a series of known higher level protocols. The data packet in general will contain some indication of which protocol is encapsulated within the packet, and these higher level protocols may contain indications of still higher level protocols. These may be checked for consistency to determine that a packet marked as a voice packet is in fact a voice packet.

In some cases, state information may be maintained relating to specific flows of data. For example, the contents of some packets may indicate the beginning of a flow of voice data, and subsequent packets may contain a flow indicator identifying them as part of the same flow. In many cases packets containing voice data may be limited to specific lengths, and the filtering may therefore check the length.

The voice protocols in use in a particular network will in general have known characteristics, and the filtering carried out in act 206 of FIG. 2 may determine whether packets marked as voice packets are consistent with these characteristics. CoS protection device 200 may respond to detection of an out-of-spec packet in a variety of ways to address the discrepancy between voice indicator field 106 and the actual type of data carried in payload 104. CoS protection device 200 may respond on the packet level by processing an out-of-spec packet in some way, or on the stream level by processing the stream the out-of-spec packet is a part of in a particular way. For example, packets, streams, or both may be discarded, rerouted, monitored, policed, counted, filtered, or processed in other ways that packets and streams are processed.

Packet filter 206 may respond to an out of spec packet in several ways. For example, packet filter 206 may simply discard an out of spec packet, indicated by the broken line arrow in FIG. 2. Packet filter 206 may also mark the packet as being out of spec, change the value of voice indicator field 106 to indicate that the packet is not a voice packet, or signal to a downstream device that the packet is out of spec, such as route lookup 208 or priority queues 210. Packet filter 206 may also execute a combination of these responses. Additionally or alternatively, packet filter 206 may perform operations on the entire stream associated with the packet.

Route lookup 208 receives packets from packet filter 206 and performs a routing table or forwarding table lookup based on one or more fields of the packet. Route lookup 208 may base the lookup in whole or in part on the voice indicator field 106 of the packet. Route lookup 208 may also take into account the filtering results of packet filter 206. For example, route lookup 208 may perform a lookup that takes into account that a packet is in spec or out of spec based on an analysis of voice indicator field 106 and payload 104. In this way, the packet may be routed to protect CoS. Route lookup 208 forwards the packet and the lookup results to priority queues 210. The lookup results may be included with the packet, provided separate from the packet data, or a combination of these.

Priority queues 210 receive the packets from route lookup 208 and queue each packet in accordance with information about the packet, such as its priority, the ports the packet is to be forwarded on, or a combination of these and other factors. Packet priority may be determined based on one or more fields in the packet or on information about the packet. For example, priority queues 208 may queue the packets based on voice indicator field 106, information received from packet filter 206, information received from route lookup 208, or a combination of these and other factors. Priority queues 208 then dequeues packets according to a dequeuing algorithm, and sends the packets to output ports 212.

Thus, CoS protection device 200 determines whether a packet marked as a voice packet is actually a voice packet by filtering the payload of packets marked as voice packets. The determination may impact how the packet and/or the stream associated with the packet is treated. For example, the determination may affect whether the packet is discarded, how it is forwarded, and how it is queued as it travels through device 200. Moreover, downstream devices may also take into account that a packet or a stream is out of spec when processing the packet or stream.

Figure 3:
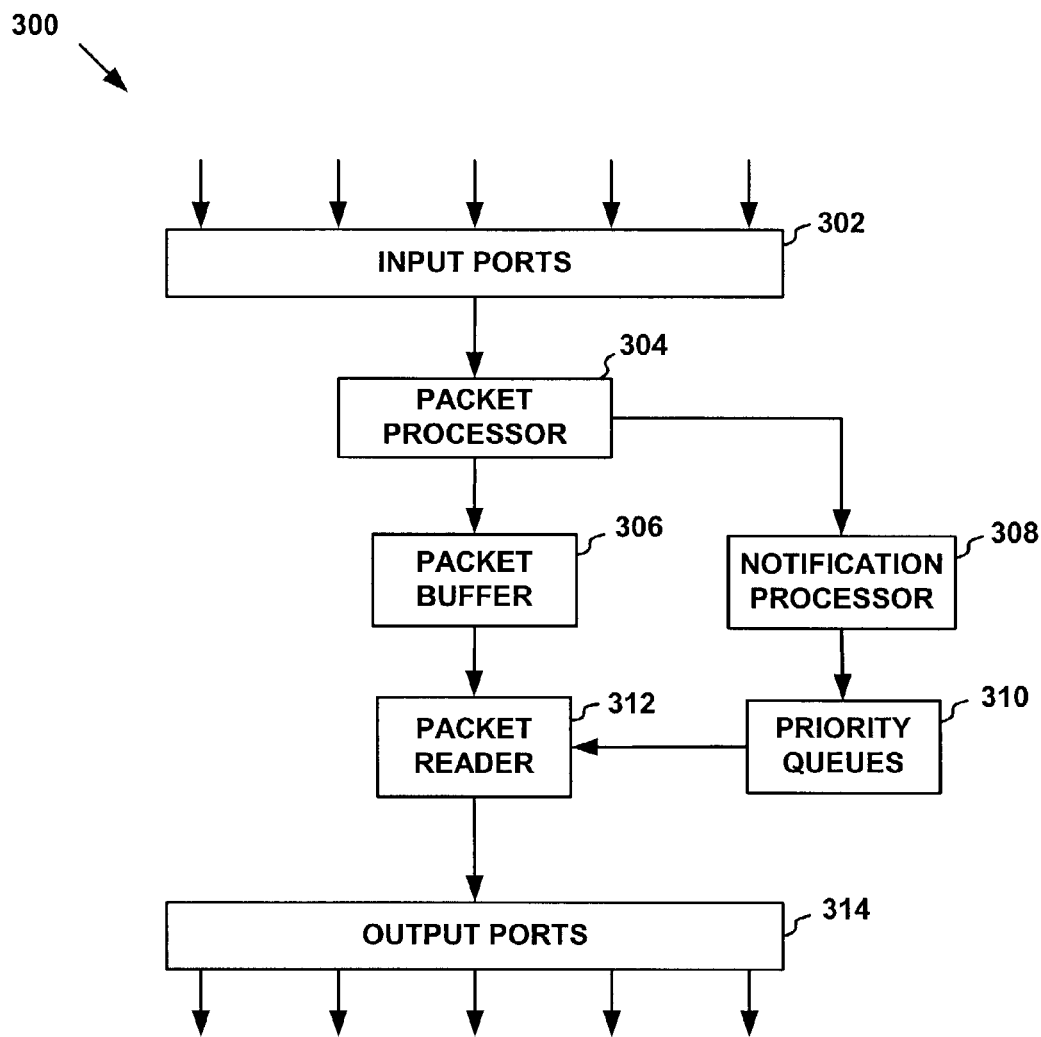
FIG. 3 is a block diagram illustrating a second embodiment of a device for protecting CoS consistent with the principles of the invention.

FIG. 3 is a block diagram illustrating a second embodiment of a device for protecting CoS consistent with the principles of the invention. Device 300 is functionally similar to device 200 of FIG. 2 in that it determines whether a packet marked as a voice packet is carrying a payload of voice data, but achieves the result in a slightly different way.

Input ports 302 and packet processor 304 operate substantially similar to input ports 202 and packet processor 204, respectively, of device 200 of FIG. 2. Packet processor 304 forwards packets to packet buffer 306 for temporary storage. The packets may be stored in the same form they are received, cells, or in any format. A variety of data structures, such as linked lists, may also be used.

Packet processor 304 creates a notification based on the packet and passes the notification to processor 308. A notification is a data structure that carries information from a packet, about a packet, or a combination of these. For example, the notification may contain information from one or more header fields of a packet, or results from packet processor 304 processing the packet. One of these fields may be the voice indicator field 106 or results from processing voice indicator field 106. Packet processor 304 may also include in the notification a segment of payload 104 and information identifying the location in packet buffer 306 of the packet corresponding to the notification.

Notification processor 308 may process each notification by performing filtering, policing, accounting, route lookup, and other packet-related operations based on the notification. In one embodiment, notification processor 308 determines from the notification that the packet marked as a voice packet filters the payload segment stored in the notification to determine whether the packet corresponding to the notification is a voice packet. After processing the notification, notification processor 308 may modify the notification based on the processing and forward the notification to priority queues 310. In cases when it is determined that the voice indicator indicates the packet is a voice packet but the payload is determined to not carry voice data, the notification may simply be dropped, effectively discarding the packet.

Priority queues 310 queue the notification based on information in the notification. For example, priority queues 310 may queue a notification based on one or more fields in the notification, such as priority, a voice packet indicator, CoS, destination, or a combination of these. Priority queues 310 then dequeues the notifications according to a dequeue algorithm, and sends the notifications to packet reader 312.

Packet reader 312 reads packets from packet buffer 306 that correspond to respective notifications, and forwards each packet to one or more of output ports 314. Packet reader 312 may process or modify the packet based on the notification. For example, if the notification indicates that the packet is out of spec, packet reader 312 may discard the packet or modify it in some way based on the out of spec indication.

In alternative embodiments, determining whether a packet is in spec or out of spec based on the correlation between the voice indicator field and the payload may occur in a variety of ways consistent with the principles of the invention. In one embodiment, packet processor 304 determines from voice indicator field 106 whether the packet is marked as a voice packet and, if so, analyzes payload 104 to determine whether the packet is in fact a voice packet. If the packet is marked as a voice packet but is not, packet processor 304 may indicate that the packet is out of spec in the notification that is sent to notification processor 308 for that packet. Downstream devices may then take the out of spec indication in the notification into account when processing the packet. For example, notification processor 308 may take into account that the packet is out of spec when performing policing, accounting, route lookup, and other operations. Similarly, priority queues 310 and packet reader 312 may also take the out of spec indication into account when performing their respective functions. Alternatively, if packet processor 304 determines that a packet is out of spec, it may simply drop the notification, effectively discarding the packet.

Similar considerations may also apply to a stream carrying an out of spec packet. After a packet in a stream has been determined to be out of spec, packet processor 304 and other elements in device 300 may treat packets in that stream differently. For example, packet processor may start to discard packets in the stream, mark packets in the stream as out of spec, change the priority of the packets in the stream, or some combination of these.

Although FIG. 2 and FIG. 3 illustrate a particular set of elements and functions, it should be understood that the elements and functionality may be migrated into other element groups than are shown in FIG. 2 and FIG. 3 without departing from the principles of the invention. Functionality in several elements may be migrated into a single element.

Figure 4:
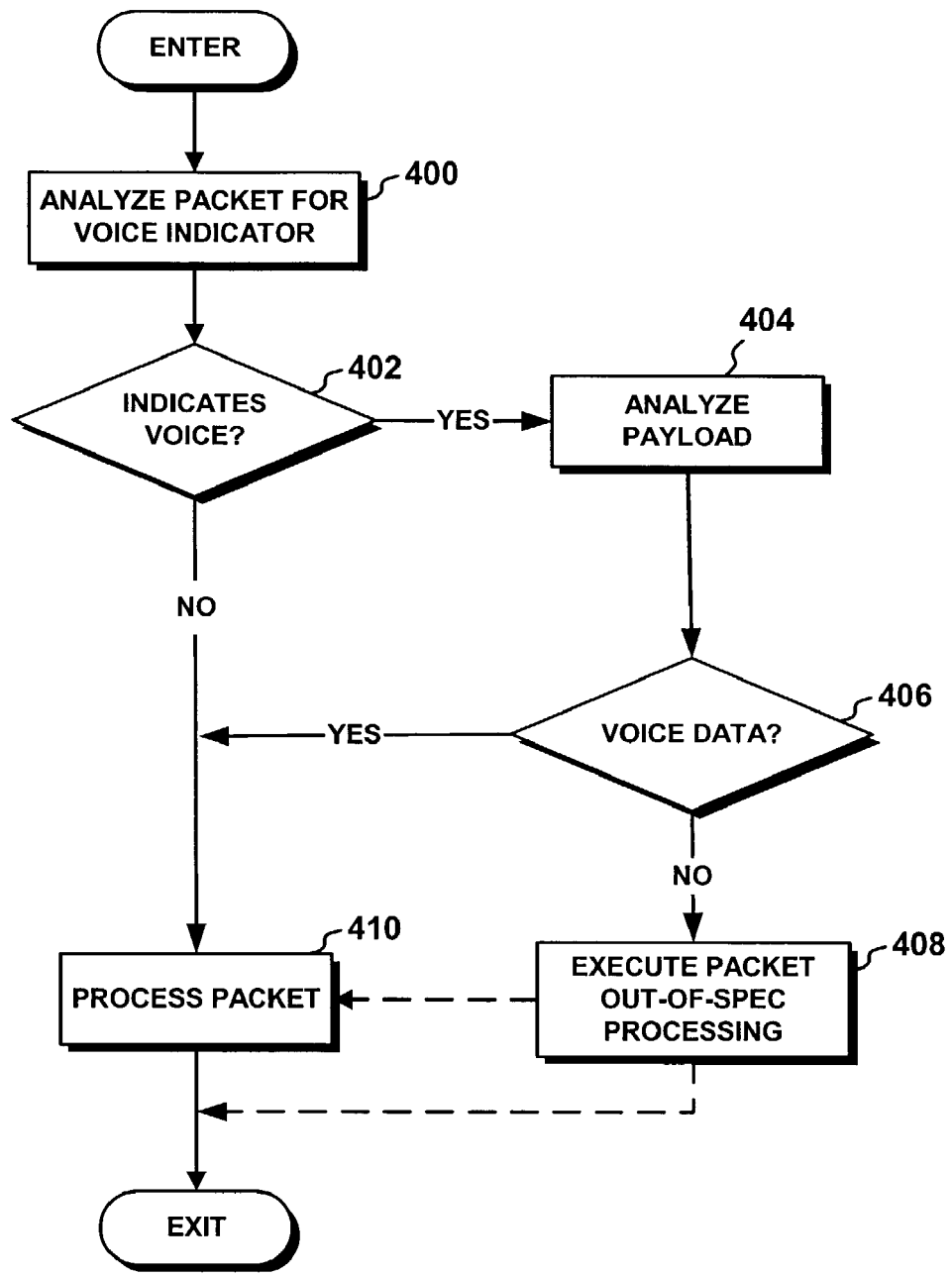
FIG. 4 is a flowchart illustrating acts for protecting CoS, consistent with the principles of the invention.

FIG. 4 is a flowchart illustrating acts for protecting CoS, consistent with the principles of the invention. The acts illustrated in flowchart may be performed by CoS protection devices, such as those illustrated in FIG. 2 and FIG. 3. A packet is first analyzed for a voice indicator (act 400). If the voice indicator indicates that the packet is a voice packet (act 402), the payload of the packet is analyzed (act 404). If the payload is voice data (act 406), then packet processing proceeds (act 410).

If the payload is not voice data (act 406), then the packet is out of spec, and out of spec processing is executed (act 408). Out of spec processing may include discarding the packet, marking the packet as out of spec, modifying the packet, such as by having its voice indicator field 106 or other field being overwritten, or a combination of these. Various out of spec processing acts are illustrated in FIG. 4 by broken line arrows. Processing may proceed with processing the packet (act 410), or the CoS protection flow may simply exit.

Other embodiments of the invention will be apparent to those skilled in the art from consideration of the specification and practice of the invention disclosed herein. For example, while the invention has been described in connection with a router, the invention may also be used in a switch or other networking device in which actions are performed on packets. Further, while the invention has been described in connection with packets, the invention may also use other data units for transporting data in a network. It is intended that the specification and examples be considered as exemplary only, with a true scope and spirit of the invention being indicated by the following claims.

What is claimed is:

1. An apparatus for analyzing data units, comprising:
    a data unit processor configured to determine whether a first field of a data unit indicates a particular type of data unit;
    a filter configured to analyze a second field of the data unit in response to a determination that the first field indicates that the data unit is the particular type of data unit, wherein the analysis of the second field includes determining whether the second field has characteristics corresponding to the particular type; and
    a data unit handler configured to execute an operation based on the second field not having characteristics corresponding to the particular type of data unit.

2. The apparatus of claim 1, wherein the first field is a priority field.

3. The apparatus of claim 1, wherein the first field is a voice indicator field.

4. The apparatus of claim 1, wherein the first field is a single bit.

5. The apparatus of claim 1, wherein the first field is a header field of the data unit.

6. The apparatus of claim 1, wherein the data unit processor is further configured to determine whether a first field of a data unit indicates a particular type of data unit for a stream that the data unit is a part of.

7. The apparatus of claim 1, wherein the second field is a payload.

8. The apparatus of claim 1, further including:
    an extractor configured to extract the second field from the data unit and store the second field in a data structure prior to analysis by the filter.

9. The apparatus of claim 1, wherein the operation includes modifying a field of the data unit.

10. The apparatus of claim 9, wherein the modified field is the first field.

11. The apparatus of claim 9, wherein the modification includes marking the data unit as out of spec.

12. The apparatus of claim 1, wherein the operation includes discarding the data unit.

13. The apparatus of claim 1, wherein the operation includes discarding a data structure associated with the data unit.

14. The apparatus of claim 1, wherein the operation includes analyzing a stream associated with the data unit.

15. The apparatus of claim 14, wherein the operation includes modifying a field in another data unit in the stream.

16. The apparatus of claim 14, wherein the operation includes discarding another data unit in the stream.

17. The apparatus of claim 1, wherein the operation includes queuing the data unit based on the second field not having characteristics corresponding to the particular type of data unit.

18. The apparatus of claim 1, wherein the operation includes routing the data unit based on the second field not having characteristics corresponding to the particular type of data unit.

19. A method for analyzing data units, comprising:
determining whether a first field of a data unit indicates a particular type of data unit;
analyzing a second field of the data unit in response to a determination that the first field indicates that the data unit is the particular type of data unit, wherein the analysis of the second field includes determining whether the second field has characteristics corresponding to the particular type; and
executing an operation based on the second field not having characteristics corresponding to the particular type of data unit.

20. The method of claim 19, wherein the first field is a priority field.

21. The method of claim 19, wherein the first field is a voice indicator field.

22. The method of claim 19, wherein the first field is a single bit.

23. The method of claim 19, wherein the first field is a header field of the data unit.

24. The method of claim 19, wherein the determining includes:
determining whether a first field of a data unit indicates a particular type of data unit for a stream that the data unit is a part of.

25. The method of claim 19, wherein the second field is a payload.

26. The method of claim 19, further including:
extracting the second field from the data unit and store the second field in a data structure prior to analysis by the filter.

27. The method of claim 19, wherein the operation includes modifying a field of the data unit.

28. The method of claim 27, wherein the modified field is the first field.

29. The method of claim 27, wherein the modification includes marking the data unit as out of spec.

30. The method of claim 19, wherein the operation includes discarding the data unit.

31. The method of claim 19, wherein the operation includes discarding a data structure associated with the data unit.

32. The method of claim 19, wherein the operation includes analyzing a stream associated with the data unit.

33. The method of claim 32, wherein the operation includes modifying a field in another data unit in the stream.

34. The method of claim 32, wherein the operation includes discarding another data unit in the stream.

35. The method of claim 19, wherein the operation includes queuing the data unit based on the second field not having characteristics corresponding to the particular type of data unit.

36. The method of claim 19, wherein the operation includes routing the data unit based on the second field not having characteristics corresponding to the particular type of data unit.

37. A network element for protecting class of service, comprising:
a data unit processor configured to determine whether a class of service field of a network data unit has a particular value;
a filter configured to analyze whether a second field of the data unit includes information consistent with the particular value; and
an execution element configured to execute an operation when the second field does not include information consistent with the particular value.

38. The network element of claim 37, wherein the data unit processor is further configured to determine whether the class of service field is in a range of values.

39. The network element of claim 37, wherein the particular value indicates the data unit is a voice data unit.

40. The network element of claim 39, wherein the filter is further configured to determine whether the information is voice information.

41. The network element of claim 37, wherein the operation includes modifying the class of service field.

42. The network element of claim 37, wherein the operation includes marking the data unit as out of spec.

43. The network element of claim 37, wherein the operation includes discarding the data unit.

44. The network element of claim 37, wherein the operation includes executing operations on a stream associated with the data unit.

45. A method of protecting class of service in a network, comprising:
determining whether a class of service field of a network data unit has a particular value;
analyzing whether a second field of the data unit includes information consistent with the particular value; and
executing an operation when the second field does not include information consistent with the particular value.

46. The method of claim 45, wherein the analyzing includes determining whether the class of service field is in a range of values.

47. The method of claim 45, wherein the particular value indicates the data unit is a voice data unit.

48. The method of claim 47, wherein the analyzing includes determining whether the information is voice information.

49. The method of claim 45, wherein the operation includes modifying the class of service field.

50. The method of claim 45, wherein the operation includes marking the data unit as out of spec.

51. The method of claim 45, wherein the operation includes discarding the data unit.

52. The method of claim 45, wherein the operation includes executing operations on a stream associated with the data unit.

* * * * *